(12) United States Patent
Morris (10) Patent No.: US 9,705,614 B2
(45) Date of Patent: Jul. 11, 2017

(54) TESTING A COMMUNICATIONS APPARATUS

(75) Inventor: Ian Morris, Bognor Regis (GB)

(73) Assignee: ASTRIUM LIMITED, Stevenage, Hertfordshire (GB)

( * ) Notice: Subject to any disclaimer, the term of this patent is extended or adjusted under 35 U.S.C. 154(b) by 426 days.

(21) Appl. No.: 14/130,202

(22) PCT Filed: Jun. 25, 2012

(86) PCT No.: PCT/EP2012/062199
§ 371 (c)(1),
(2), (4) Date: Mar. 7, 2014

(87) PCT Pub. No.: WO2013/000852
PCT Pub. Date: Jan. 3, 2013

(65) Prior Publication Data
US 2015/0365182 A1      Dec. 17, 2015

(30) Foreign Application Priority Data

Jun. 30, 2011  (EP) .................................... 11275102

(51) Int. Cl.
H04B 17/00      (2015.01)
H01P 5/18       (2006.01)
H04B 17/40      (2015.01)

(52) U.S. Cl.
CPC ......... *H04B 17/40* (2015.01); *H04B 17/0085* (2013.01)

(58) Field of Classification Search
USPC ........ 333/109, 114; 455/67.11, 67.15, 67.16, 455/226.1, 226.2, 226.3, 226.4
See application file for complete search history.

(56) References Cited

U.S. PATENT DOCUMENTS

| 5,635,944 A | 6/1997 | Weinstein et al. |
| 2003/0064683 A1 | 4/2003 | Matthews et al. |

(Continued)

FOREIGN PATENT DOCUMENTS

| DE | 101 06 557 A1 | 9/2002 |
| GB | 2 202 995 A | 10/1988 |

OTHER PUBLICATIONS

International Preliminary Report on Patentability (PCT/IB/373) mailed on Jan. 7, 2014, by the European Patent Office as the International Searching Authority for International Application No. PCT/EP2012/062199.

(Continued)

*Primary Examiner* — Blane Jackson
(74) *Attorney, Agent, or Firm* — Buchanan Ingersoll & Rooney PC (57) ABSTRACT

A test arrangement includes a multi-port test interface having a first waveguide coupled to a plurality of second waveguides. The first waveguide is arranged to propagate an input signal and each of the second waveguides is arranged to output the input signal, providing a plurality of test signals to be supplied to a communications apparatus. Such a test interface may also be used to output respective channel signals in a multiplexed signal received from a communications apparatus. The test interface permits the provision and/or monitoring of a large number of channel signals without separate respective connections to the communications apparatus. This may be particularly useful where tests are performed in a constrained space and/or where repeated access to the apparatus is impractical. The simultaneous provision of many channel signals may allow evaluation of co-channel interference.

18 Claims, 9 Drawing Sheets

(56) References Cited

U.S. PATENT DOCUMENTS

2003/0179052 A1    9/2003  Sawdey et al.
2004/0113718 A1    6/2004  Loeffelholz et al.

OTHER PUBLICATIONS

International Search Report (PCT/ISA/210) mailed on Aug. 14, 2012, by the European Patent Office as the International Searching Authority for International Application No. PCT/EP2012/062199.
Written Opinion (PCT/ISA/237) mailed on Aug. 14, 2012, by the European Patent Office as the International Searching Authority for International Application No. PCT/EP2012/062199.
Office Action issued on Feb. 5, 2014, by the European Patent Office in corresponding European Patent No. 11 275 102.9-1852. (5 pages).

TESTING A COMMUNICATIONS APPARATUS

FIELD OF THE INVENTION

The present invention relates to testing of a communications apparatus configured to receive and transmit multiplexed signals.

BACKGROUND OF THE INVENTION

The performance of a communications apparatus may be tested by applying one or more input signals and evaluating the signal characteristics of one or more output signals. In particular, a transponder for use in a satellite may undergo extensive pre-flight testing to check and characterise its performance, in terms of its output signal characteristics and/or a radiation pattern of its antenna arrangement.

Such transponders are configured to carry several communication channels. For example, a satellite transponder operating in the Ka band may transmit and receive signals for over a hundred communication channels. This may require a corresponding number of connections to the transponder via one or more test interfaces, resulting in a complex testing arrangement. This may be problematical where the testing environment is a vacuum chamber, since there may be insufficient space to accommodate the test interfaces and connectors required for testing each channel.

An object of the present invention is the facilitation of improved multi-channel testing of a communications apparatus.

SUMMARY OF THE INVENTION

According to the present invention, there is provided a test arrangement having a test interface configured to provide a plurality of first test signals to an apparatus, wherein the test interface includes a first waveguide, a plurality of second waveguides coupled to the first waveguide and a plurality of first ports corresponding to respective ones of the second waveguides, the first waveguide is arranged to receive a first input signal through a first input port, the first waveguide and the second waveguides are configured to propagate the first input signal, and the first ports are arranged to output the first input signal propagated in respective ones of the second waveguides as respective first test signals.

In other words, the test arrangement includes a multiport test interface.

In such a test interface, each of the plurality of second waveguides can be used to provide a test signal for a corresponding channel to be received by the apparatus under test. Such a test interface can permit the supply of input signals corresponding to any, some or all of the channels simultaneously.

The use of such a multi-port test interface permits the provision of a large number of channel signals without requiring separate respective connections to an apparatus under test. This may be particularly useful where the test is performed in a constrained space, for example, when testing equipment for a space-based application in a vacuum chamber, where there may be only limited space available for accommodating connectors and/or where repeated access to the apparatus under test to change the connections might be time-consuming or otherwise impractical.

The first waveguide and the second waveguides may be configured to propagate the first input signal, and the first ports may be arranged to output the first input signal propagated in respective ones of the second waveguides as respective first test signals.

The first and second waveguides may be arranged in the form of an elongated waveguide and multiple cross-guide portions respectively.

The test interface may include a first output port configured to output the first input signals propagated in the first waveguide.

The first waveguide may be arranged to receive a second input signal through a second input port, the second input signal having a different frequency from the first input signal, the first and second waveguides may be configured to propagate the second input signal, the test interface may include second ports corresponding to respective ones of the second waveguides, and the second ports may be arranged to output the second input signal propagated in respective ones of the second waveguides as respective second test signals for supply to a second apparatus.

The test signals and second test signals may be separated using filters. Such a configuration may allow more than one apparatus, or part of an apparatus, to be tested in parallel using the plurality of test signals and the plurality of second test signals respectively. For example, if testing a satellite communications apparatus, the configuration may be used to generate test signals for an antenna arrangement and a repeater simultaneously.

The test interface may include second ports corresponding to respective ones of the second waveguides, the second ports may be arranged to receive a plurality of second input signals, wherein frequencies of the second input signals are different from the frequency of the first input signal, the second waveguides may be configured to propagate respective ones of the second input signals, and the first ports may be arranged to output respective ones of the second input signals.

The test interface may be arranged to output said first test signals and said second test signals simultaneously.

The test interface may include a first output port configured to output at least one of the first input signal propagated in the first waveguide and the second input signal propagated in the first waveguide.

The apparatus may include an antenna arrangement arranged to produce an output based on the plurality of first test signals, and the test arrangement may comprise a detector configured to detect spatial variations in a radiation pattern of the antenna arrangement of the apparatus.

The test interface may include second ports corresponding to respective ones of the second waveguides, the second ports may be arranged to receive a plurality of second input signals for propagation in respective ones of the second waveguides and in the first waveguide, and the first ports may be arranged to output respective ones of the second input signals propagated in respective ones of the second waveguides.

The first interface may include a first output port, arranged to output at least one of the first input signal propagated in the first waveguide and a multiplexed signal combining the second input signals propagated in the first waveguide.

The test interface may include a monitoring port. The signal propagated by the first waveguide may be sampled to provide a return signal via the monitoring port. The return signal can be used to monitor the input signal supplied to the communications apparatus. For example, the return signal may be compared with an output signal of the communications apparatus to determine performance characteristics of the communications apparatus. The monitoring port may be a waveguide interface, such as an end of the first waveguide or one of the second waveguides, or a coaxial interface provided by a coaxial to waveguide transition in the first waveguide or one of the second waveguides.

Additionally, or alternatively, where the communications apparatus includes an arrangement of one or more antennas, the test arrangement may include a detector for determining spatial variations in an output of the antenna arrangement. As the test interface allows the input of multiple channel signals in parallel and, therefore, allows the test conditions to resemble the operating conditions to a greater degree than previous test arrangements. Furthermore, the radiation pattern may correspond more closely to the radiation pattern produced by the communications apparatus when in normal operation. In particular, this may permit the evaluation of potential co-channel interference between coverage areas for channels utilising the same band of frequencies or overlapping bands of frequencies.

The use of such a multi-port test interface in this manner avoids the need for separate connections to be made between the apparatus and a monitoring arrangement. This may be particularly useful where the test is performed in a constrained space and/or where repeated access to the apparatus under test to change the connections might be time-consuming or otherwise impractical.

The test interface may include a plurality of second outputs corresponding to respective ones of the second waveguides, arranged to output a plurality of test signals based on respective ones of the plurality of signals received from the apparatus. This allows the output signals from the apparatus to be used for testing other equipment. For example, the output of a repeater may be monitored, through the signal from the first waveguide, while a plurality of test signals based on the output of the repeater are supplied to an antenna arrangement.

The test interface may include an input port of the first waveguide, arranged to receive an input signal, the second outputs being configured to output the input signal as a plurality of test signals, wherein the input signal has a frequency that is different from the frequency of the signals received from the apparatus and first input signal have different frequencies. Such an arrangement allows the generation of two sets of test signals having different frequencies, one based on the input signal and one based on the signals from the apparatus.

The apparatus may include an antenna arrangement arranged to produce an output based on the plurality of second test signals, and the test arrangement may comprise a detector configured to detect spatial variations in a radiation pattern of the antenna arrangement of the apparatus.

The test arrangement may include a second test interface having a third waveguide arranged to propagate the first input signal, a plurality of fourth waveguides coupled to the third waveguide and a second plurality of first ports corresponding to respective ones of the fourth waveguides, wherein the third waveguide may be arranged to receive the first input signal from the first waveguide, the third waveguide and the fourth waveguides may be configured to propagate the first input signal, and the second plurality of first ports may be arranged to output the first input signal propagated in respective ones of the fourth waveguides as respective first test signals. For example, the test interfaces may be prefabricated to have a standard number of second waveguides and configured to be connectable to one another for use in a test arrangement where a number of second waveguides that is greater than the standard number is required. In such an arrangement, the first and third waveguides may be connected using a coaxial interface, for example, using a coaxial cable, or by a direct waveguide interface.

The test arrangement may include a second test interface configured to receive a plurality of further input signals from the apparatus, the second test interface including a third waveguide and a plurality of fourth waveguides coupled to the first waveguide and a further plurality of first ports corresponding to respective ones of the fourth waveguides; and the fourth waveguides being arranged to propagate respective ones of the plurality of signals, wherein the first waveguide may be arranged to output a multiplexed signal including the plurality of further input signals, and/or the further plurality of first ports may be configured to output the further input signals propagated in respective ones of the fourth waveguides.

According to the present invention, there is also provided a method comprising providing a test interface configured to provide a plurality of test signals to an apparatus, the test interface including a first waveguide, a plurality of second waveguides coupled to the first waveguide and a plurality of first ports corresponding to respective ones of the second waveguides, providing an input signal to the first waveguide, and outputting from the first ports respective ones of the signals propagated in the second waveguides to provide the plurality of test signals.

The apparatus may be a repeater and may comprise an antenna arrangement arranged to produce an output based on the test signals, and the method may comprise detecting spatial variations in a radiation pattern of the antenna arrangement.

According to the present invention, there is further provided a method including providing a test interface including a first waveguide and a plurality of second waveguides coupled to the first waveguide, outputting a plurality of signals from an apparatus, receiving the plurality of signals at respective ones of said second waveguides, and outputting from the first waveguide a multiplexed signal including a plurality of channel signals.

According to the present invention, there is further provided a test arrangement having a test interface configured to receive a plurality of first input signals from an apparatus, wherein the test interface includes a first waveguide, a plurality of second waveguides coupled to the first waveguide and a plurality of first ports corresponding to respective ones of the second waveguides, the second waveguides are arranged to receive respective ones of the first input signals through respective ones of the first ports, the second waveguides are configured to propagate the respective ones of the first input signals, and the first waveguide includes a first port, configured to output a multiplexed signal including the plurality of first input signals.

The test arrangement may comprise a plurality of second ports corresponding to respective ones of the second waveguides, wherein the second ports may be arranged to output respective ones of the first input signals propagated in respective ones of the second waveguides.

The test arrangement may be configured to test an apparatus including an antenna arrangement, wherein the test arrangement may be configured to supply the signals output by the second ports to the antenna arrangement, and the test arrangement may include a detector configured to detect spatial variations in a radiation pattern of the antenna arrangement.

According to the present invention, there is further provided a method comprising providing a test interface configured to receive a plurality of signals from an apparatus, the test interface including a first waveguide, a plurality of second waveguides coupled to the first waveguide and a plurality of first ports corresponding to respective ones of the second waveguides, providing said signals to respective ones of the second waveguides, and outputting from a port of the first waveguide a multiplexed signal including the plurality of signals from the apparatus.

The test interface may comprise a plurality of second ports corresponding to respective ones of the second waveguides, and the method may comprise outputting from the second ports the signals propagated in respective ones of the second waveguides, supplying the signals output from the second ports to the antenna arrangement, and detecting spatial variations in a radiation pattern of the antenna arrangement.

According to the present invention, there is further provided a test arrangement having a first test interface configured to provide a plurality of test signals to an apparatus, including a first waveguide, a plurality of second waveguides coupled to the first waveguide and a plurality of first ports corresponding to respective ones of the second waveguides, wherein the first waveguide and the second waveguides are arranged to propagate an input signal and the first ports are arranged to output the input signal to provide respective ones of the plurality of test signals, and a second test interface configured to receive a plurality of signals from the apparatus, including a third waveguide and a plurality of fourth waveguides coupled to the third waveguide, wherein the fourth waveguides are arranged to receive respective ones of the plurality of signals from the apparatus and the third waveguide is arranged to output a multiplexed signal including the plurality of signals.

According to the present invention, there is further provided a test arrangement having a first test interface configured to provide a plurality of first test signals to a first apparatus, including a first waveguide, a plurality of second waveguides coupled to the first waveguide and a plurality of first ports corresponding to respective ones of the second waveguides, wherein the first waveguide and the second waveguides are arranged to propagate a first input signal and the first ports are arranged to output the first input signal to provide respective ones of the plurality of first test signals, and a second test interface configured to provide a plurality of second test signals to a second apparatus, including a third waveguide, a plurality of fourth waveguides coupled to the third waveguide, and a plurality of second ports corresponding to respective ones of the fourth waveguides, wherein the third waveguide and the fourth waveguides are arranged to propagate a second input signal and the second ports are arranged to output the second input signal to provide respective ones of the plurality of second test signals.

According to the present invention, there is further provided a test arrangement having a first test interface configured to provide a plurality of test signals to an apparatus, including a first waveguide, a plurality of second waveguides coupled to the first waveguide and a plurality of first ports corresponding to respective ones of the second waveguides, wherein the first waveguide and the second waveguides are arranged to propagate an input signal and the first ports are arranged to output the input signal to provide respective ones of the plurality of test signals, and a second test interface configured to receive a plurality of signals from the apparatus, including a third waveguide, a plurality of fourth waveguides coupled to the third waveguide, and a plurality of second ports corresponding to respective ones of the fourth waveguides, wherein the fourth waveguides are arranged to receive respective ones of the plurality of signals from the apparatus and the third waveguide is arranged to output a multiplexed signal including the plurality of signals, and wherein the second ports are arranged to output respective ones of the plurality of signals.

According to the present invention, there is further provided a test interface comprising a first waveguide arranged to receive a first input signal through a first input port, a plurality of second waveguides coupled to the first waveguide, and a plurality of first ports corresponding to respective ones of the second waveguides, wherein the first waveguide and the second waveguides are configured to propagate the first input signal, and the first ports are arranged to output the first input signal propagated in respective ones of the second waveguides as respective first test signals.

BRIEF DESCRIPTION OF THE DRAWINGS

Embodiments of the present invention will now be described, by way of example, with reference to the accompanying drawings, in which.

DETAILED DESCRIPTION

Figure 1:
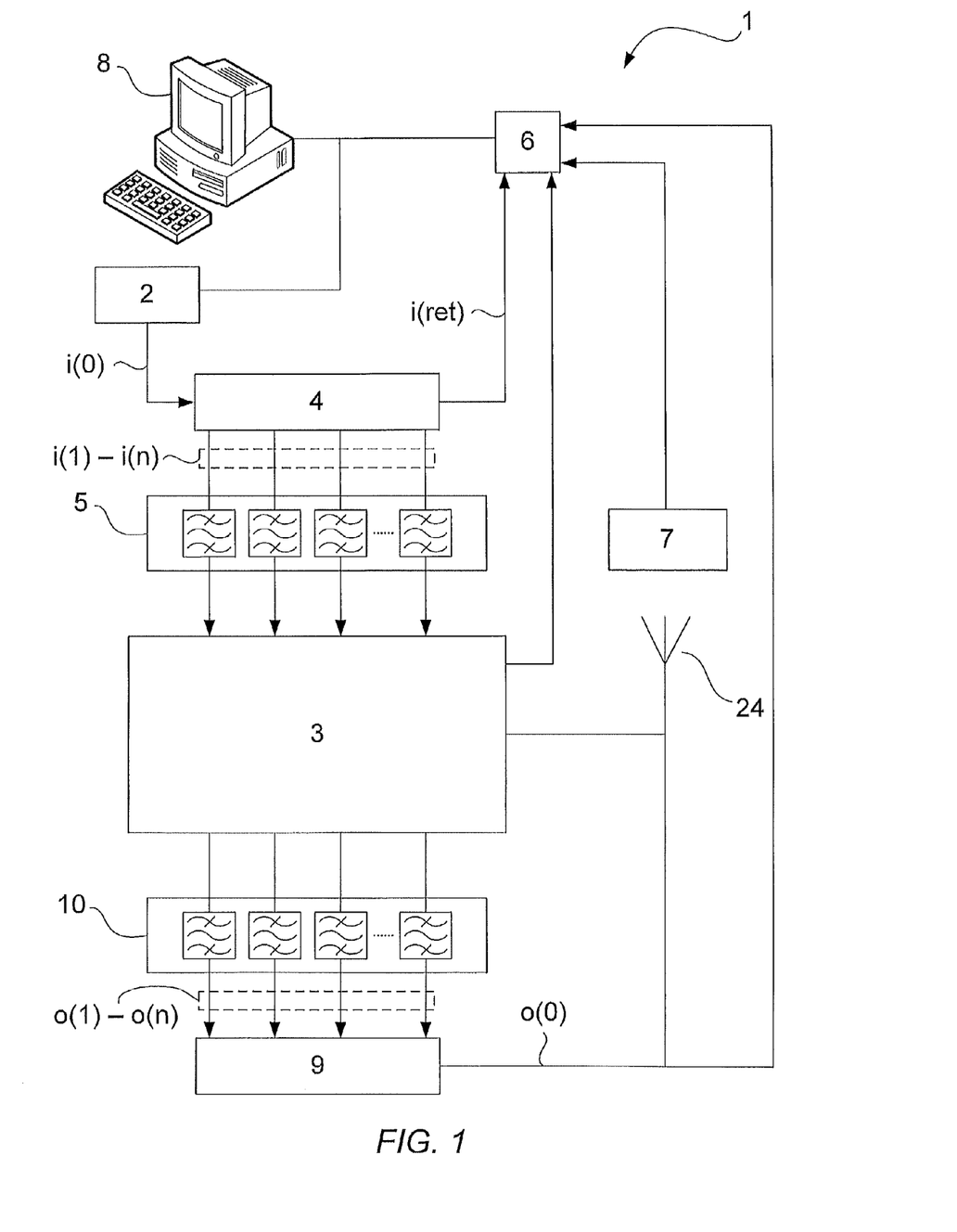
FIG. 1 depicts a test arrangement according to a first embodiment of the invention.

FIG. 1 depicts a test arrangement 1 according to a first embodiment of the invention. The test arrangement 1 includes a signal generator 2, arranged to provide an input signal i(o) signal to be applied to a communications apparatus 3. The input signal i(o) is provided to a multi-port test interface unit (MTIU) 4, which is configured to provide multiple outputs for the input signal i(o) to supply a plurality of test signals i(1)-i(n) to the communications apparatus 3. In the present embodiment, the test signals i(1)-i(n) produced by the MTIU 4 are input into a filtering arrangement 5, configured to filter the test signals i(1)-i(n) so that the test signals i(1)-i(n) are divided between two or more different frequency bands and/or to avoid reflections. The test arrangement also includes one or more detectors 6, 7 arranged to detect properties of an output from the communications apparatus 3 and a controller 8 arranged to control the signal generator 2 and the detectors 6, 7. In this particular example, the controller 8 is a computer comprising one or more processors or microprocessors, not shown.

The example test arrangement shown in FIG. 1 also includes a second filtering arrangement 10, and a second MTIU 9 arranged to receive multiple output signals o(1) to o(n) from the communications apparatus 3 via the second filtering arrangement 10. An output signal o(o) from the second MTIU 9 may also be directed to one of the detectors 6.

Figure 2:
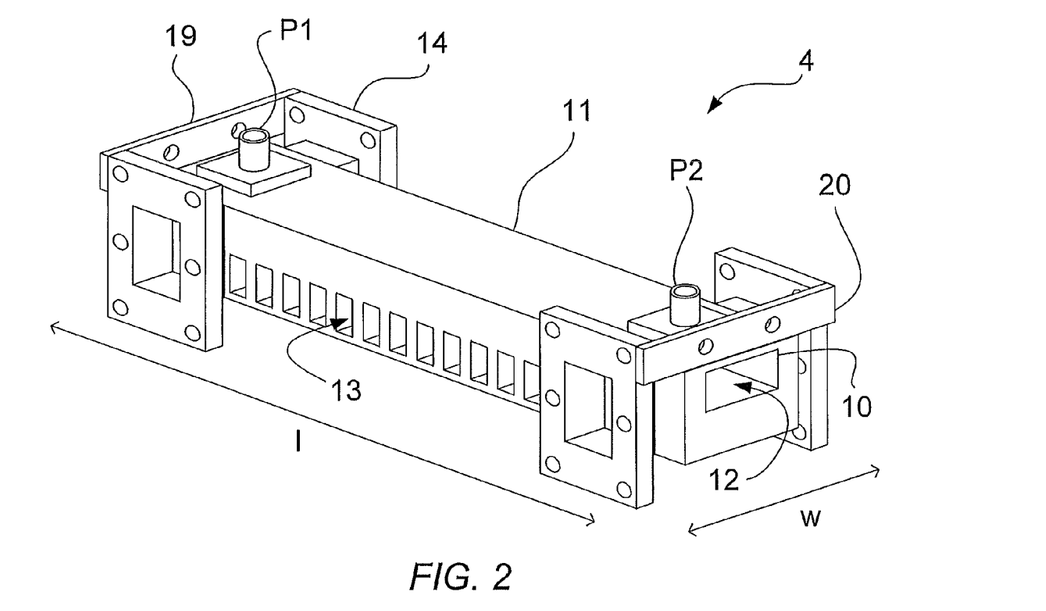
FIGS. 2 and 3 depict a test interface that can be utilised in the test arrangement of FIG. 1.
Figure 3:
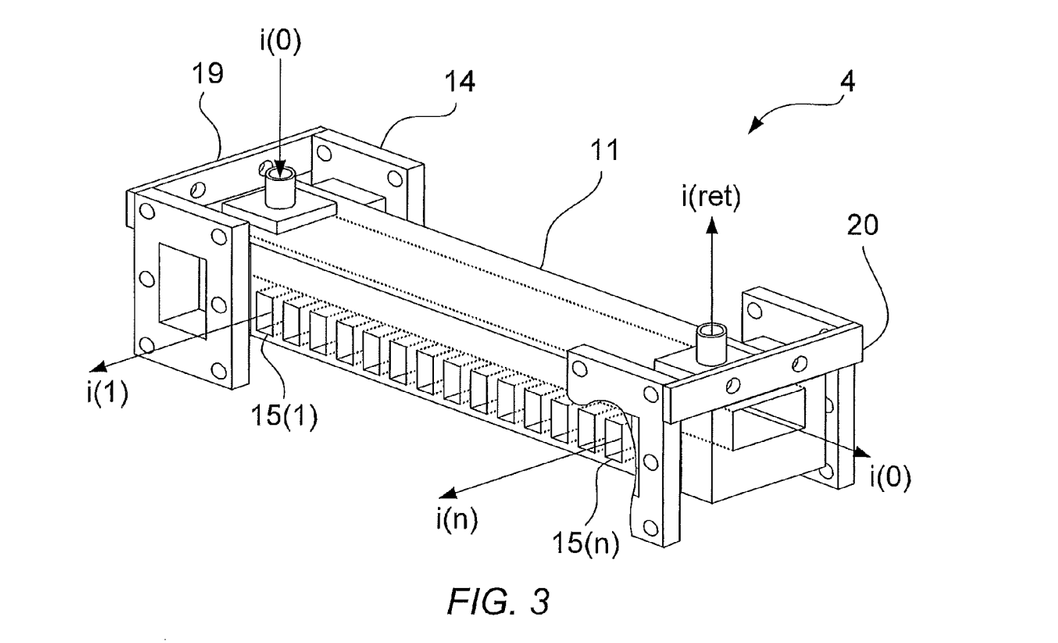

FIG. 2 depicts a MTIU 4, while FIG. 3 depicts the same MTIU 4 showing part of its inner structure. The MTIU 4 includes a test interface 11 having a first waveguide 12 and a plurality of second waveguides 13. In this particular example, the test interface 11 is formed from a machined block of metal and the first and second waveguides 12, 13 are hollow elongate rectangular waveguides. Each second waveguide 13 is coupled to the first waveguide 12, in a similar manner to that used in a cross-guide coupler, to allow communication between the first and second waveguides 12, 13. Flanges 14 may be provided to allow the test interface 11 to be fixed into a position within the test arrangement 1.

In the present example, the test interface includes a total of 14 second waveguides 13(1)-13(n), of which two are hidden from view in FIG. 2. In other embodiments however, other numbers of second waveguides may be provided. The MTIU 4 further comprises first and second end flanges 19, 20. The end flanges 19, 20 allow one MTIU 4 to be coupled to one or more other MTIUs if more output ports are required than are present on a single MTIU.

An input signal i(o) can, therefore, be supplied to an input port P1 of the test interface 11, and split to provide a plurality of test signals i(1) to i(n) at outputs 15(1) to 15(n) corresponding to the second waveguides 13. The second waveguides 13 are arranged such that the test signals i(1) to i(n) output from the second waveguides 13 are each substantially the same as the input signal i(o). That is, in the present embodiment, each second waveguide is arranged to have a coupling factor to the first waveguide that is substantially constant across all frequencies in the input signal i(o), such that all frequencies in the input signal i(o) are coupled to all of the output ports 15(1) to 15(n). If required, a further output port P2 may be provided, as a further output for a return signal i(ret) that can be used for monitoring purposes.

Figure 4:
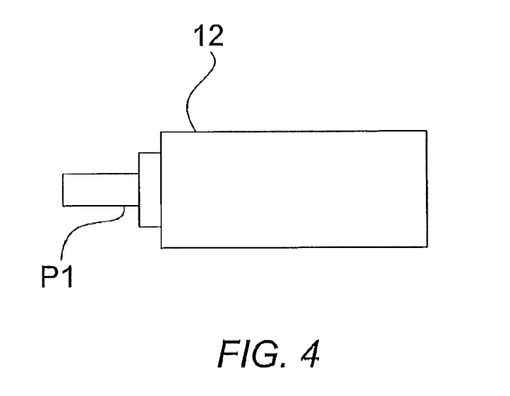
FIGS. 4 and 5 depict example ports for inputting and outputting signals from a test interface in the test arrangement of FIG. 1.
Figure 5:
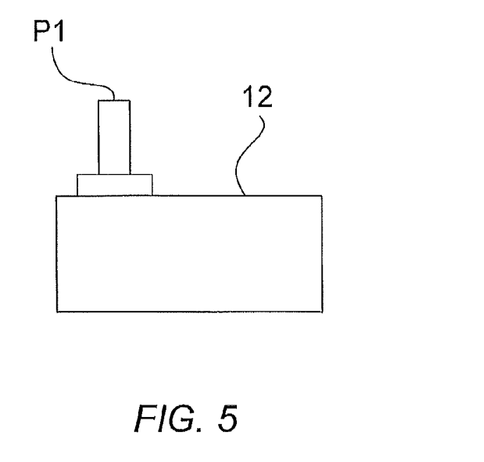

The input signal i(o) may be supplied to the input port P1 via a coaxial-to-waveguide transition. FIGS. 4 and 5 depict examples of input ports P1 configured to receive a coaxial connector. The input port P1 may be provided at an end face of the first waveguide 12 as an end-launch transition, as depicted in FIG. 4, or on a side face of the test interface P1 as a side-wall transition, as shown in FIGS. 2, 3 and 5. The output port P2 and/or outputs 15(1) to 15(n) shown in FIGS. 2 and 3 may be configured similarly to receive coaxial connectors.

As an alternative to coaxial connectors, the input signal i(o) may be supplied to the input port P1 and/or a monitoring signal i(ret) output from the output port P2 using a direct waveguide interface. For example, in the embodiment shown in FIGS. 2 and 3, a direct waveguide interface 10 is provided at an end of the first waveguide 12. This interface 10 can be used to send the input signal i(o) to another MTIU coupled to the first MTIU 4. If the first MTIU 4 of FIGS. 2 and 3 is to be used on its own, i.e. if the first MTIU 4 has a sufficient number of output ports 13(1)-13(n) to meet the test requirements, the direct waveguide interface 10 at the end of the first waveguide 12 may be terminated, or may be omitted completely.

Depending on the test requirements, the second MTIU 9 may have a structure that is the same as or, alternatively, different to that of the first MTIU 4 shown in FIGS. 2 and 3.

An example of suitable dimensions for a test interface 11 is a length l of approximately 350 mm and a width w of approximately 30 mm. However, test interfaces of other dimensions may be provided, depending on the requirements of the test, the equipment under test and the conditions under which the test is to be held. For example, the length of the test interface 11 may depend on the number of outputs 15(1) to 15(n) needed to provide the required number of test signals i(1) to i(n).

While the MTIU 4 in this particular example has fourteen outputs 15(1) to 15(n), MTIUs in other embodiments of the invention may have a different number of outputs 15(1) to 15(n), from two upwards, depending on the characteristics of the apparatus 3 to be tested. For example, where the communication apparatus 3 under test is a repeater, the MTIU 4 may have a number of second waveguides 13 that is greater than, or equal to, the number of channels that the repeater is intended to receive and transmit. For testing a Ka-band transponder in such an apparatus, that number of channels may be greater than, or equal to, a hundred and so a MTIU 4 with a hundred or more outputs 15(1) to 15(n) may be provided. The required number n of outputs 15(1) to 15(n) may be provided by manufacturing a single test interface 4 configured with the required number n of second waveguides 13 and outputs 15(1) to 15(n). Alternatively, as shown in FIGS. 6 and 7, two or more test interfaces 11a, 11b, 11c may be connected together to provide the required number of outputs 15(1) to 15(n).

Figure 6:
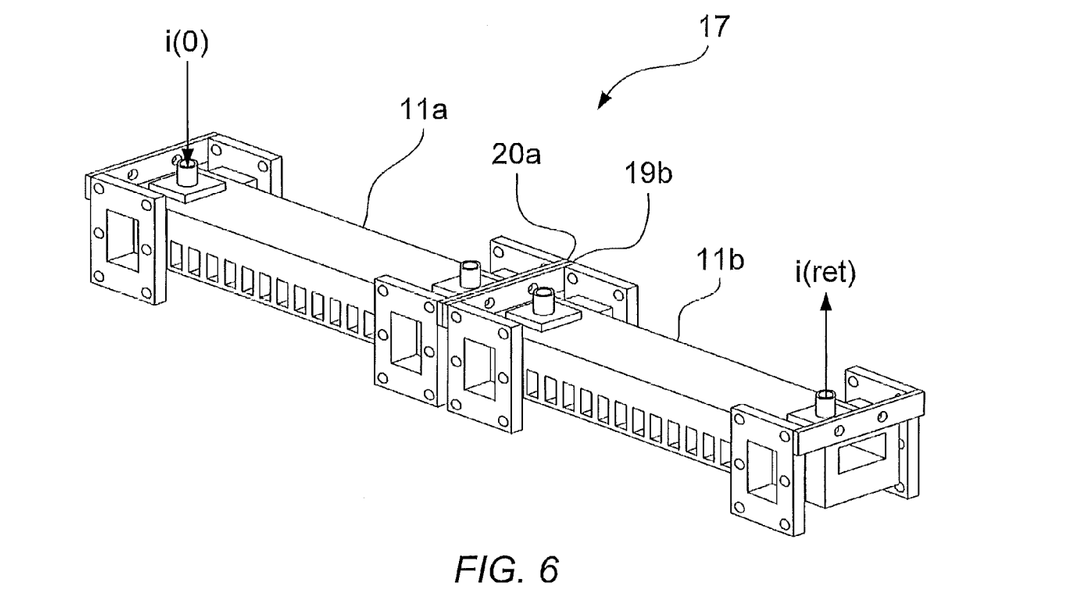
FIG. 6 depicts an alternative test interface that can be utilised in the test arrangement of FIG. 1.

FIG. 6 depicts an alternative MTIU 17 that may be used in place of one or both of the test interfaces 4, 9 in the test arrangement of FIG. 1. In this example, two test interfaces 11a, 11b are connected together so that their respective first waveguides are in communication with one another and an input signal i(o) supplied to the first waveguide of the first test interface 11a can pass into the first waveguide of the second test interface 11b. In the present example, the test interfaces 11a, 11b are joined together by bolting together respective end flanges 19b, 20a of the first and second test interfaces 11a, 11b. Alternatively, the test interfaces 11a, 11b may be connected together using a coaxial cable, via ports such as those shown in FIGS. 4 and 5.

Figure 7:
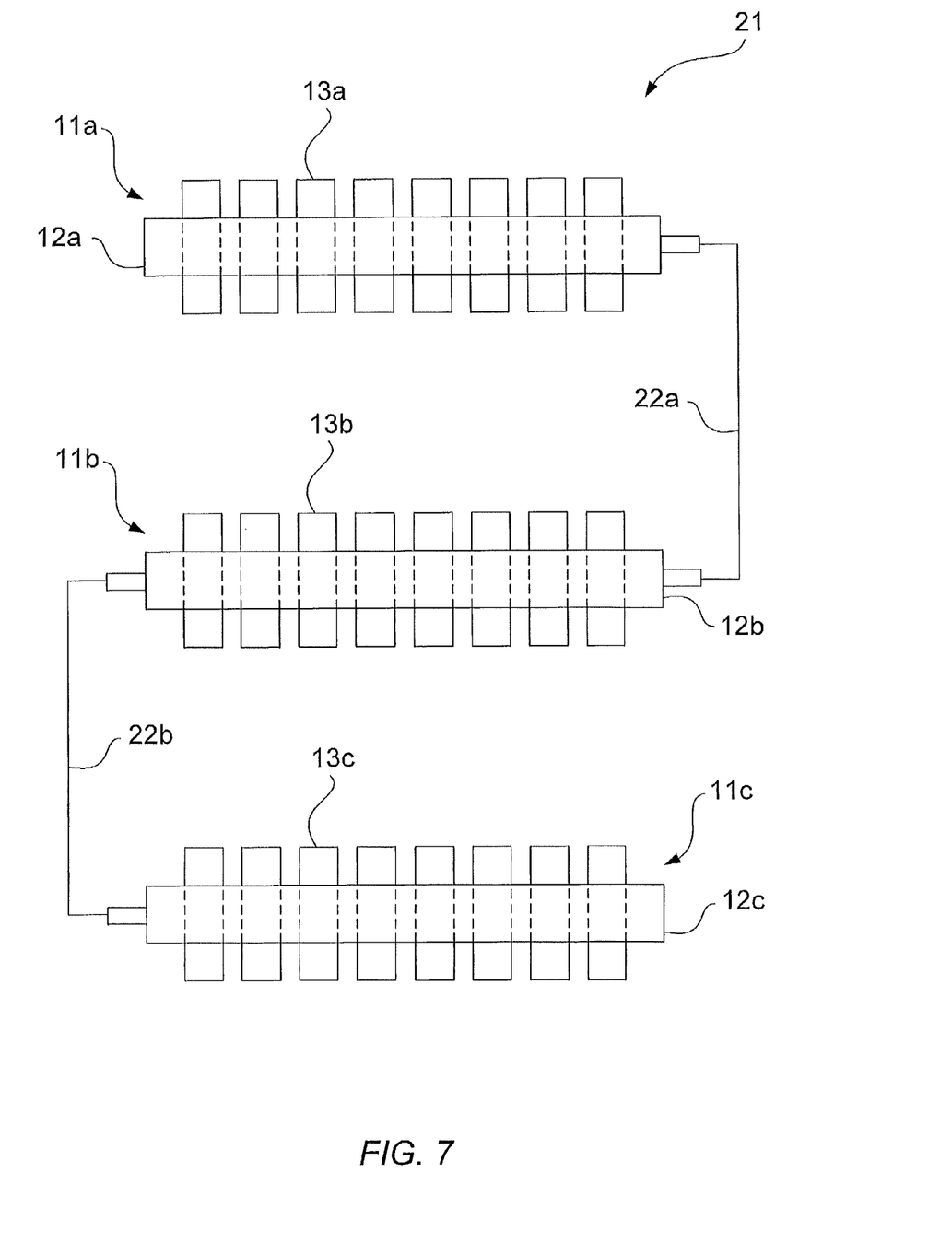
FIG. 7 depicts another alternative test interface that can be utilised in the test arrangement of FIG. 1.

FIG. 7 depicts another alternative MTIU 21 that may be used in place of one or both of the MTIUs 4, 9 in the test arrangement 1 of FIG. 1. In FIG. 7, only the first waveguides 12a, 12b, 12c and second waveguides 13a, 13b, 13c of the test interface 11a, 11b, 11c are illustrated, with the remaining components of each test interface being omitted for clarity. In this example, the MTIU 21 includes three test interfaces 11a, 11b, 11c, connected together in series by coaxial cables 22a, 22b, which convey the input signal i(o) from one test interface 11a, 11b, 11c to another. This allows the test interfaces 11a, 11b, 11c to be positioned in a folded configuration, so that a greater number of outputs 15(1) to 15(n) can be provided without significantly increasing the overall length 1 of the MTIU 21.

In other embodiments, folded configurations having two or more test interfaces 11a, 11b, 11c and an appropriate number of connecting waveguides may be used.

In further embodiments, a folded configuration may be provided in which two or more test interfaces 11a, 11b, 11c are connected by further waveguides.

Where arrangements where test interfaces 11a, 11b, 11c are connected together, as in the examples shown in FIGS. 6 and 7, the test interfaces 11a, 11b, 11c can be prefabricated with a standard number of outputs 15(1) to 15(n). If a test arrangement requires a number of input signals i(1) to i(n) that exceeds the standard number, a suitable test interface can be provided by connecting two or more prefabricated test interfaces 11a, 11b, 11c together.

Figure 8:
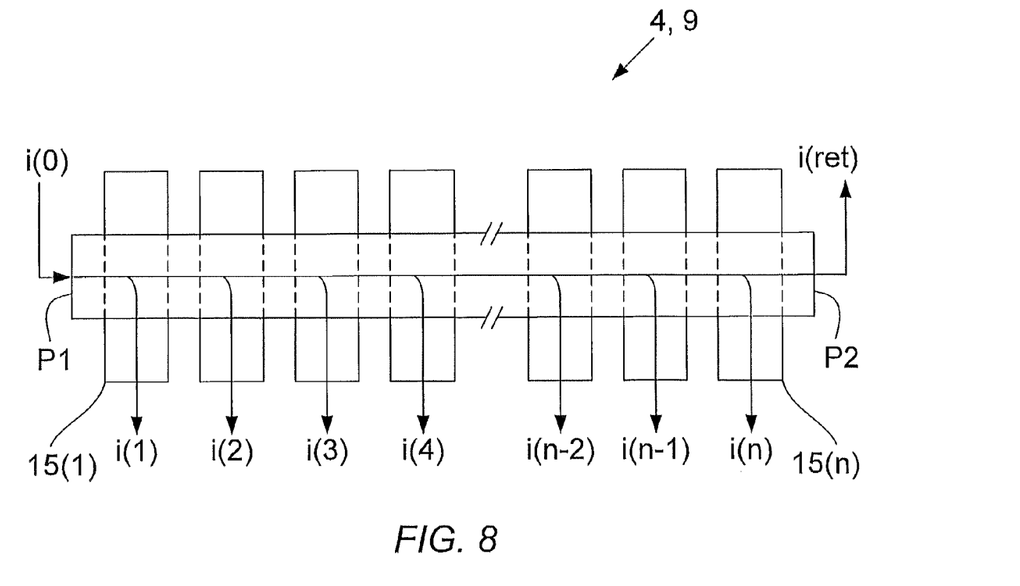
FIG. 8 depicts the flow of signals through a test interface of the arrangement of FIG. 1 when used to split an input signal into a plurality of test signals.

FIG. 8 shows the flow of signals through MTIUs 4, 9 in the test arrangement of FIG. 1. An input signal i(o) is provided via an input port P1 of the MTIU 4. The input signal i(o) propagates through the first and second waveguides. A plurality of test signals i(1) to i(n) can then be obtained from output ports 15(1) to 15(n) of the MTIU 4, filtered by respective filters in the filtering arrangement 5 and supplied to corresponding inputs of the communications apparatus 3. In another embodiment of the invention, filters may be provided at the output ports 15(1) to 15(n). Such filters may be used as well as, or in place of, the separate filtering arrangement 5 shown in FIG. 1.

A monitoring signal i(ret) may be obtained via the output port P2 of the first waveguide, for example, for comparison with the input signal i(o) to check that the MTIU 4 is functioning in the expected manner.

Referring back to FIG. 1, in the embodiment shown, two detectors 6, 7 are provided. The first detector 6 is arranged to receive output signals o(1) to o(n) from the communications apparatus 3.

For example, the detector 6 may be configured to compare the output signals o(1) to o(n) with the monitoring signal i(ret) and/or the input signal i(o) and determine one or more performance characteristics of the communications apparatus 3, such as linearity, group delay, gain variation with frequency, a relationship between input power and output power and so on. Alternatively, or additionally, the detector 6 may be arranged to receive the input signals i(1) to i(n) and to compare them with the output signals o(1) to o(n).

The communications apparatus 3 may be, or may include, an antenna arrangement 24 having one or more antennas and, optionally, one or more elements such as reflectors. The antenna arrangement 24 may be configured to provide multiple spot beams, so that channel signals can be transmitted to different areas, or cells, in a communication system. The second detector 7 may be a radiation detector configured to determine a radiation pattern of such an antenna arrangement 24.

The second MTIU 9 in the test arrangement 1 may be arranged to generate test signals for the antenna arrangement 24, in the manner shown in FIG. 8. In other words, an input signal, corresponding to i(o) in FIG. 8, may be provided to the input port P1 of the MTIU 9 and the output signals from each output port 15(1) to 15(n) of the second MTIU 9, corresponding to test signals i(1) to i(n) in FIG. 8, used as input for the antenna arrangement 24.

Figure 9:
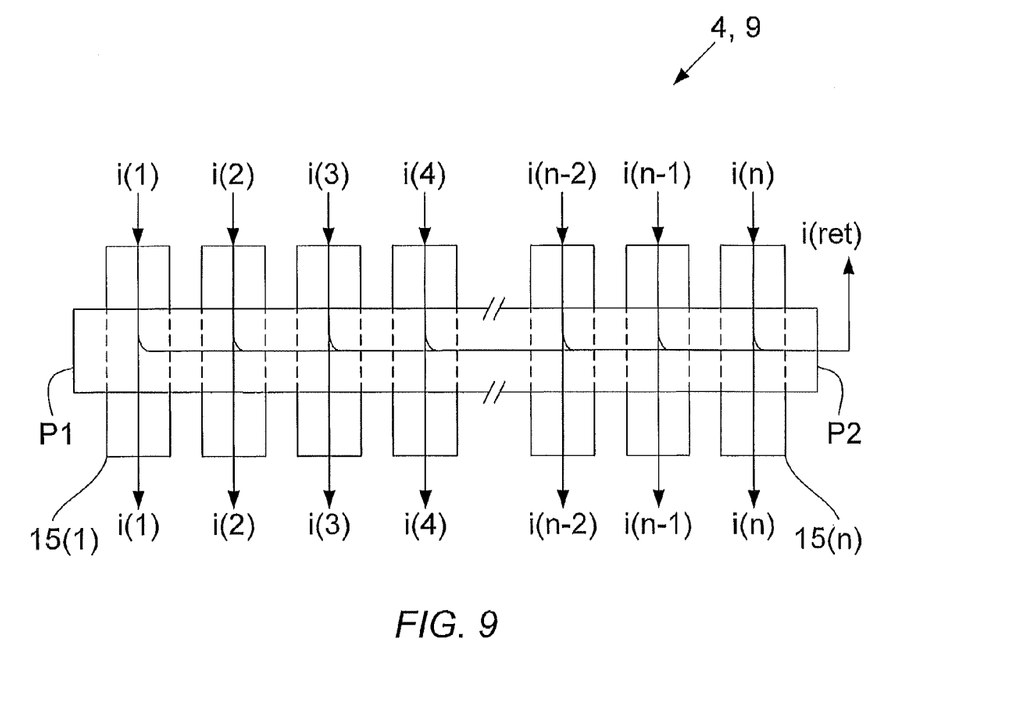
FIG. 9 depicts the flow of signals through a test interface of the test arrangement of FIG. 1 when used to generate a combined output signal from a plurality of received signals.

FIG. 9 shows an MTIU 4, 9 in another arrangement that is also suitable for generating test signals for the antenna arrangement 24. In the arrangement of FIG. 9, the input port P1 is terminated and a plurality of input signals i(1) to i(n) are supplied to inputs of the second waveguides and output by the outputs 15(1) to 15(n). For example, the input signals i(1) to i(n) may be the channel signals sent from an antenna to the repeater during a test. Additionally, because the second waveguides are coupled to the first waveguide, a monitoring signal i(ret) corresponding to the combined input signals i(1) to i(n) may be obtained via port P2.

In the MTIUs of FIGS. 7, 8 and 9, each second waveguide extends on both sides of the first waveguide such that each second waveguide has both an input port and an output port. This allows the MTIU to be coupled, for example, between an antenna and repeater, whilst allowing signals to pass unchanged from the antenna to the repeater. The MTIU may therefore be left in place when the communications satellite is deployed, since it does not interfere with normal operation of the apparatus to which it is connected. During testing of the antenna and repeater prior to launch, the port P1 can be coupled to the signal generator 2 to inject test signals i(1) to i(n) into the repeater. Alternatively, or at the same time, the other port P2 can be coupled to the detector 6 to monitor the return signal i(ret). Once testing is complete, both ports P1 and P2 can be terminated, and the MTIU may then be left in place without interfering with normal operation of the satellite.

Figure 10:
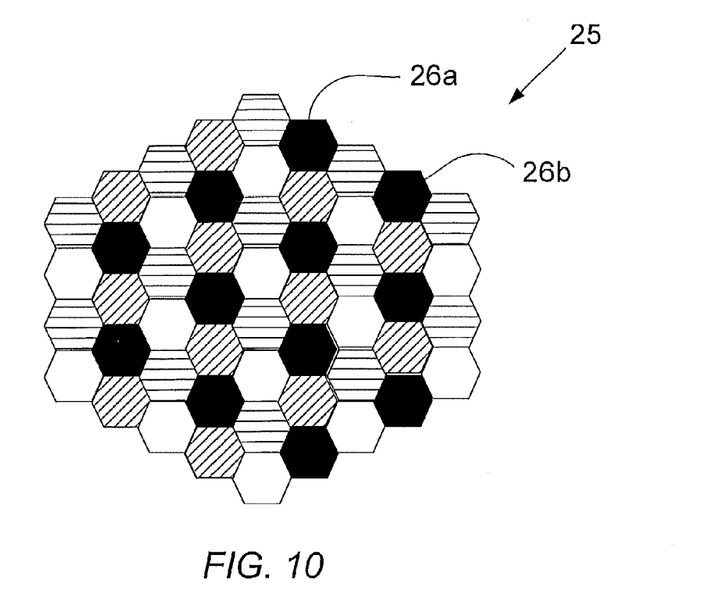
FIG. 10 depicts the re-use of channels across coverage areas of an antenna arrangement in a communications apparatus to be tested.

The supply of test signals i(1) to i(n) for multiple channels in pseudo-parallel, using the MTIU 9, allows the radiation pattern to be determined when the antenna arrangement 24 is utilised to send a considerable number, or even all, of the channel signals. This may be particularly useful for determining co-channel interference. FIG. 10 depicts an example of a channel re-use plan 25 for multiple cells a communication system. In FIG. 10, the black, white, diagonal and horizontal shading indicate a frequency band A, B, C, D in which channel signals are transmitted in a given cell. The test arrangement may be arranged to supply test signals o(1) to o(n) for the channels that are to be transmitted at a particular frequency band A. The radiation pattern detected by the detector 7 can then be used to investigate whether there is any interference between the signals transmitted to the cells 26a, 26b and so on, using that particular frequency band A.

Figure 11:
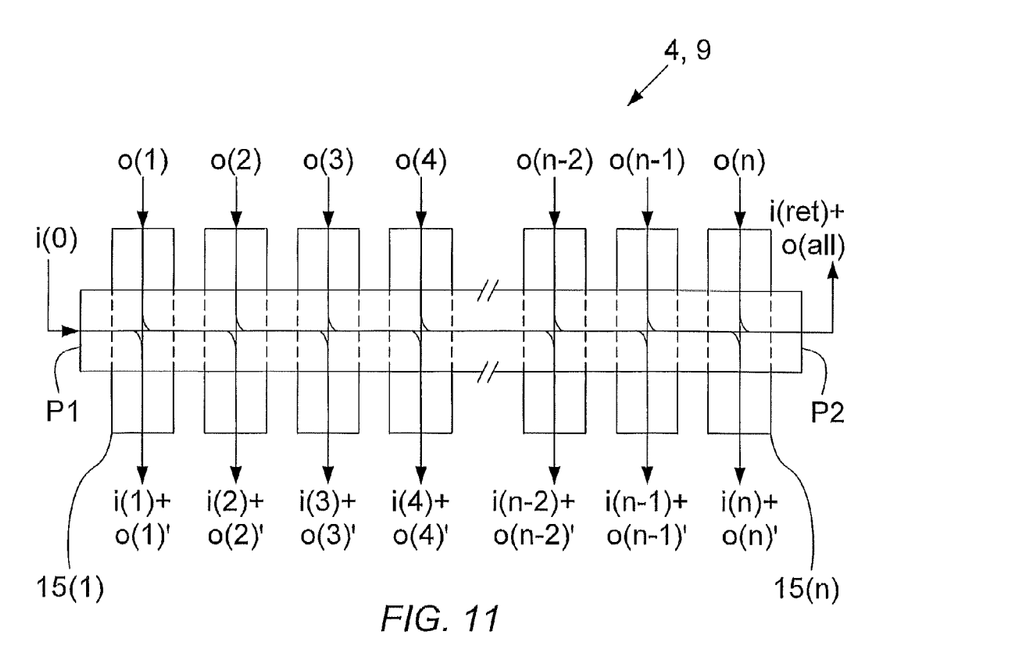
FIG. 11 depicts the flow of signals through a test interface of the test arrangement of FIG. 1 when used to generate two sets of test signals.

FIG. 11 depicts a MTIU 9 when used to generate multiple sets of test signals simultaneously. In this particular example, channel signals o(1) to o(n) output by the communications apparatus 3 are supplied to input ports of the second waveguides. The ports may be coaxial ports, similar to those shown in FIGS. 4 and 5. The channel signals o(1) to o(n) are filtered before entering the MTIU 9 to avoid reflections by a filtering arrangement 10, as shown in FIG. 1 or by filters provided in the MTIU 9, for example, in the form of tuned cavities in the input ports or the second waveguides.

In a similar manner to that shown in FIG. 8, the MTIU 9 outputs test signals o(1)' to o(n)' corresponding to respective ones of the channel signals o(1) to o(n) and a multiplexed signal o(all) based on the channel signals o(1) to o(n), for output through port P2.

In addition, a further input signal i(o) is supplied to port P1 of the MTIU 9. The further input signal i(o) has a different frequency from the channel signals o(1) to o(n). In a similar manner to that shown in FIG. 8, a plurality of second test signals i(1) to i(n), based on the further input signal i(o), can be provided through the output ports 15(1) to 15(n) in addition to the output signals o(1)' to o(n)'. Similarly, a monitoring signal i(ret) can be obtained from port P2 in addition to the multiplexed signal o(all).

Therefore, the MTIU 9 can be used to generate two sets of test signals, i(1) to i(n) and o(1)' to o(n)'. As the test signal i(1) and second test signal o(1)' obtained from any one of the second waveguides differ in frequency, they can be separated using filters, such as tuned cavities within the MTIU 9 corresponding to an output 15(1) or an external filter arrangement.

Figure 12:
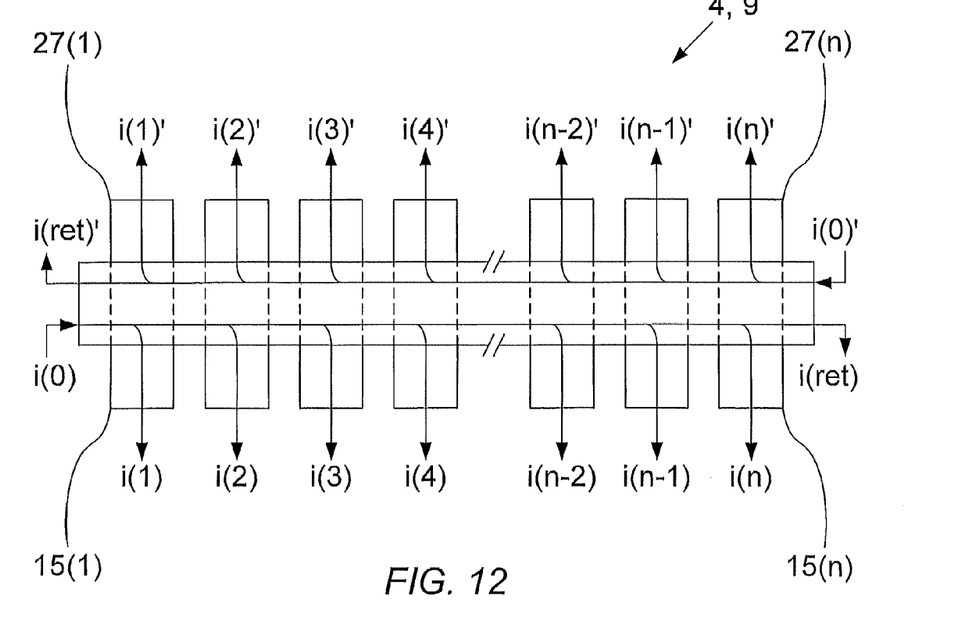
FIG. 12 depicts the flow of signals through a test interface of the test arrangement of FIG. 1 when used in an alternative technique for generating two sets of test signals.

In FIGS. 9 and 11, each second waveguide is shown as having an input port at one end and an output port at the other end. However, as the MTIU is a passive, reciprocal device, any port can be used as an input or output. For example, as shown in FIG. 12, an MTIU 4 can simultaneously output two sets of test signals. A first input signal i(o) is supplied to port P1 of the MTIU 4, and test signals i(1) to i(n) are output as described above in relation to FIG. 8. In addition, a second input signal i(o)', which has a different frequency to the first input signal i(o), is supplied to port P2 of the MTIU 4 which, in a similar manner, outputs second test signals i(1)' to i(n)'. The first and second test signals i(1) to i(n), i(1)' to i(n)' have different frequencies and so can be separated using filters, as described above in relation to FIG. 11. In this particular example, the second waveguides include differently tuned cavities at their ends, so that the first test signals i(1) to i(n) are output via output ports 15(1) to 15(n) and the second test signals are output via ports 27(1) to 27(n). In addition, monitoring signals i(ret), i(ret)' can be obtained from ports P2 and P1 respectively.

Figure 13:
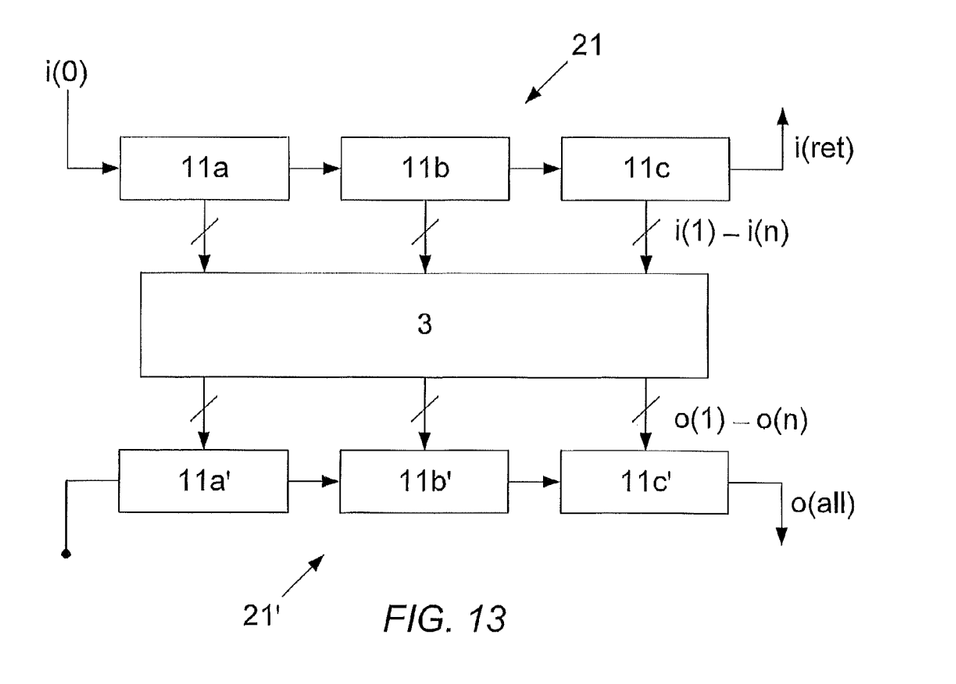
FIG. 13 depicts a part of the test arrangement of FIG. 1 when used in a first test mode.
Figure 14:
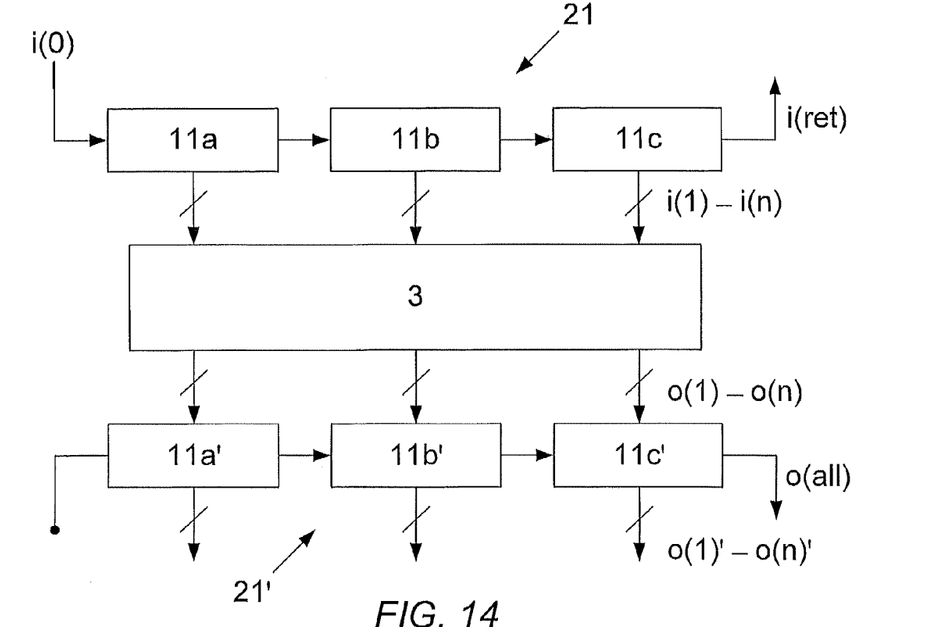
FIG. 14 depicts a part of the test arrangement of FIG. 1 when used in a second test mode.
Figure 15:
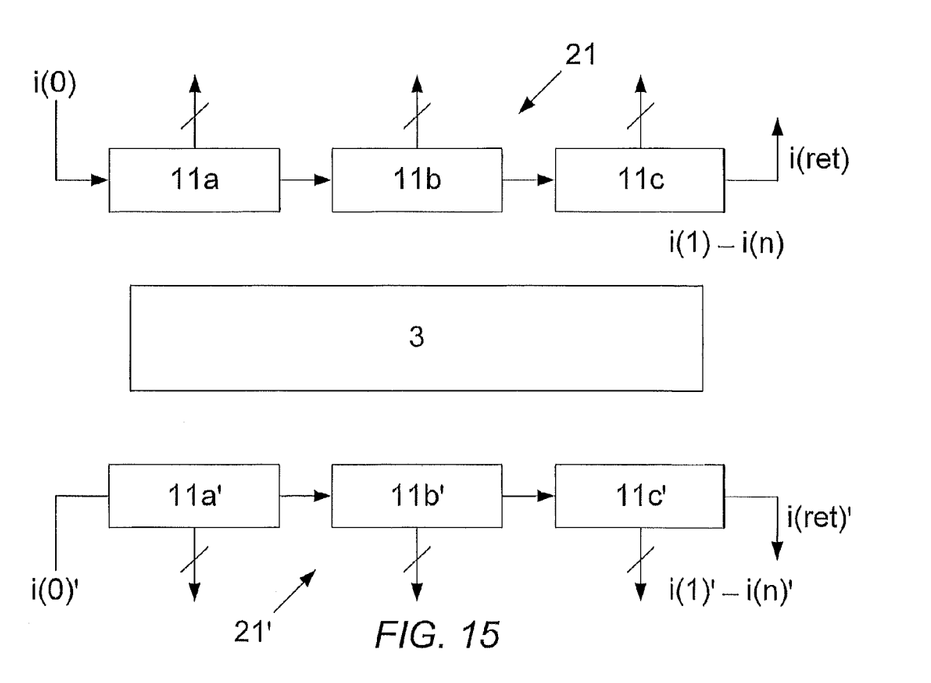
FIG. 15 depicts a part of the test arrangement of FIG. 1 when used in a third test mode.

FIGS. 13 to 15 depict part of the test arrangement of FIG. 1, including one or more MTIUs 21, 21', in example test configurations.

FIG. 13 shows an example configuration for a first test mode, suitable for testing a satellite repeater. A first MTIU 21 is used to provide a plurality of test signals 1(1) to i(n), in the manner shown in FIG. 8. The first MTIU 21 comprises three test interfaces 11a, 11b, 11c coupled together, for example as shown in FIG. 6 or 7. The test signals i(1) to i(n) are provided as input channel signals to the repeater 3. The channel signals o(1) to o(n) output by the repeater 3 are combined into a multiplexed output signal o(all) by a second MTIU 21'. Like the first MTIU 21, the second MTIU 21' also comprises three test interfaces 11a', 11b', 11c' coupled together, for example as shown in FIG. 6 or 7.

FIG. 14 depicts a second test mode using the first and second MTIUs 21, 21', which is an alternative to that shown in FIG. 13. In the second test mode, output signals o(1)' to o(n)' are generated, which correspond to the output signals o(1) to o(n) from the repeater 3, in the manner shown in FIG. 9. The output signals o(1)' to o(n)' can be monitored individually, to assess the performance of the repeater 3 for each channel, and/or used as input signals to an antenna arrangement 24, so that the repeater 3 and the antenna arrangement 24 can be tested in a combined test or, if required, simultaneously.

FIG. 15 depicts a third test mode. In this mode, one or more test signals i(1) to i(n), i(1)' to i(n)' are generated by first and second MTIUs 21, 21' respectively, in the manner shown in FIG. 8. Such signals may be used to test antenna arrangements 24. For example, one set of test signals i(1) to i(n) may be used to test a receiving antenna arrangement, while the other set of test signals i(1)' to i(n)' may be input to a transmitting antenna arrangement 24. In such an example, the second set of test signals i(1)' to i(n)' could be high power signals, relative to the first set of test signals i(1) to i(n), in order to simulate operating conditions.

While the arrangements shown in FIGS. 13 to 15 include two MTIUs 21, 21', other arrangements may utilise one MTIU to perform the functions of both MTIUs 21, 21'. For example, in the arrangements of FIGS. 13 and 14, one MTIU may be used to generate the test signals i(1) to i(n) from the input signal i(o) and to generate the multiplexed output signal o(all) and, optionally, output signals o(1)' to o(n)' from the output channel signals o(1) to o(n) in the manner described above and shown in FIG. 11. Similarly, the MTIUs 21 in FIG. 14 can be replaced with one MTIU arranged to generate two sets of test signals i(1) to i(n), to i(n)' from respective input signals i(o), i(o)' in the manner depicted in FIG. 12.

Figure 16:
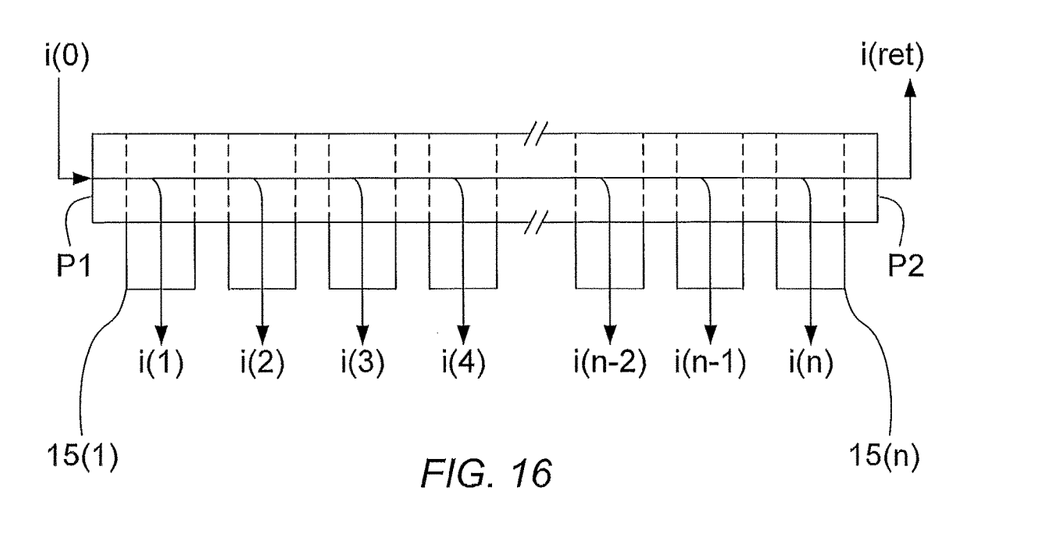
FIG. 16 depicts an embodiment of a single-sided test interface.

Although the test interfaces 11, 11a, 11b, 11c shown in FIGS. 2 to 9 and 11 to 15 have second waveguides which extend on either side of the first waveguide, in other embodiments the second waveguides may be terminated at one end such that only one end of the second waveguide is used as an input/output port. An example of such a test interface is shown in FIG. 16, in which the test interface has a plurality of output ports 15(1) to 15(n) corresponding to the plurality of second waveguides. Like the test interface of FIG. 8, when an input signal i(o) is provided to port P1, test signals i(1) to i(n) are output from the output ports 15(1) to 15(n), and a monitoring signal i(ret) can be obtained at port P2.

Figure 17:
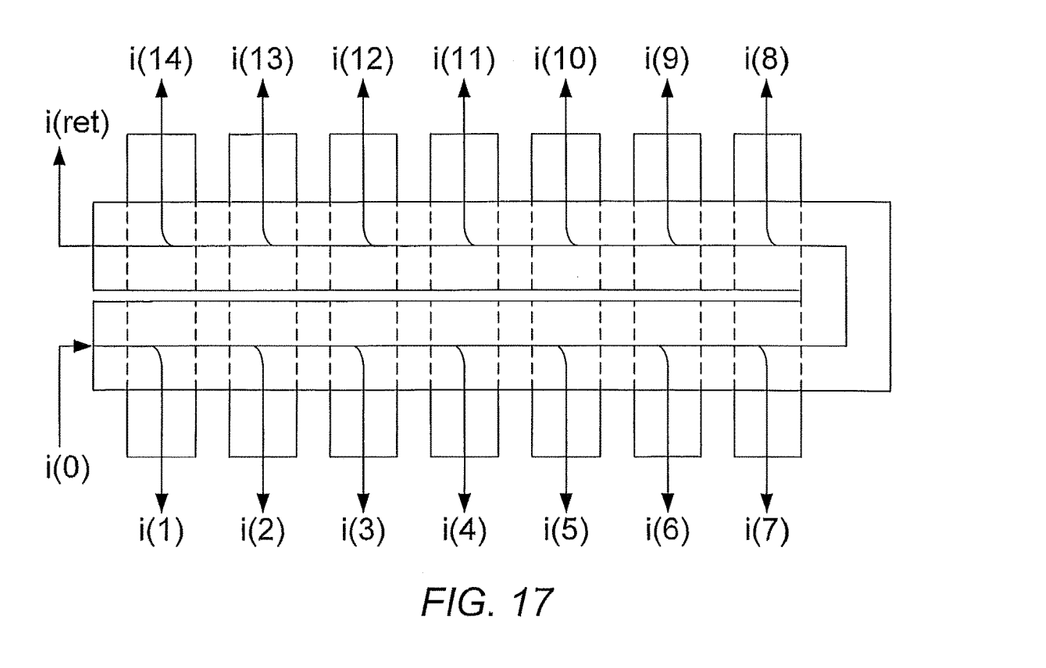
FIG. 17 depicts an embodiment of a test interface having a folded first waveguide.

Similarly, although the test interfaces 11, 11a, 11b, 11c shown in FIGS. 2 to 9 and 11 to 16 are linear in form, test interfaces having other configurations may be used in test arrangements according to other embodiments. FIG. 17 illustrates an example of a test interface having a folded first waveguide, with a total of fourteen second waveguides extending from one side of the first waveguide. In other embodiments, other numbers of second waveguides may be provided. Like the previous examples, when an input signal i(o) is provided to port P1, test signals i(1) to i(14) are output from the output ports, and a monitoring signal i(ret) can be obtained at port P2.

The embodiments described above provide test arrangements utilising one or more multi-port test interface units 4, 9, 17, 21 to simplify the provision of a plurality of test signals i(1) to i(n) to a communication apparatus 3. The embodiments allow multiple test signals i(1) to i(n) to be supplied simultaneously, which can provide a more accurate simulation of operating conditions and allow evaluation of potential interference effects.

Testing conditions may prevent the provision of a large volume of space for accommodating connections and/or impede the changing of connections. For example, where the communications apparatus is intended for use in space, the test may require vacuum conditions where the available space is limited and the changing of connections and the repeated obtaining of vacuum conditions following changes to connections may be time-consuming. The use of a multi-port test interface 4, 9, 17, 21 may simplify the connections between a signal generator 2 and a communications apparatus 3, potentially reducing the space needed to accommodate the connections and reducing the need to change connections, with particular regard to prior arrangements in which single connections have been used.

Moreover, the MTIUs 4, 9, 17, 21 can be used to generate multiple sets of test signals, allowing two or more tests to be performed simultaneously. In this manner, more than one apparatus, or more than one section of an apparatus, can be tested without requiring reconfiguration of the test arrangement 1. This is particularly advantageous where the testing is carried out in a vacuum environment, as it can, potentially, reduce the number of times that the vacuum is broken and re-established. This can allow the test procedure to be expedited.

The test interfaces 4, 9, 17, 21 described above may be suitable for both high and low power tests, for example, when testing transmitting and receiving functions of a repeater respectively.

The arrangements described with reference to FIGS. 1 to 15 provide non-limiting example embodiments of the invention. In particular, while FIG. 6 depicts a MTIU 17 with two test interfaces 11, FIGS. 8, 9 and 11 depict MTIUs 4, 9 with only one test interface 11 and FIGS. 7 and 13 to 15 depict MTIUs 21 with three test interfaces 11a, 11b, 11c, the invention may be embodied using a MTIU with any number of test interfaces.

Modifications to those arrangements may be made without departing from the scope of the invention as defined by the following claims.

The invention claimed is:

1. A test arrangement comprising:
a test interface configured to provide a plurality of first test signals to an apparatus;
wherein:
the test interface includes a first waveguide, a plurality of second waveguides coupled to the first waveguide and a plurality of first ports corresponding to respective ones of the second waveguides;
the first waveguide is arranged to receive a first input signal through a first input port;
the first waveguide and the second waveguides are configured to propagate the first input signal;
the first ports are arranged to output the first input signal propagated in respective ones of the second waveguides as respective first test signals;
the test interface includes second ports corresponding to respective ones of the second waveguides;
the second ports are arranged to receive a plurality of second input signals for propagation in respective ones of the second waveguides and in the first waveguide; and
the first ports are arranged to output respective ones of the second input signals propagated in respective ones of the second waveguides.

2. A test arrangement according to claim 1, wherein the test interface includes a first output port configured to output the first input signals propagated in the first waveguide.

3. A test arrangement according to claim 1, wherein:
the first waveguide is arranged to receive a second input signal through a second input port, the second input signal having a different frequency from the first input signal;
the first and second waveguides are configured to propagate the second input signal; and
the second ports are arranged to output the second input signal propagated in respective ones of the second waveguides as respective second test signals for supply to a second apparatus.

4. A test arrangement according to claim 3, wherein the test interface is arranged to output said first test signals and said second test signals simultaneously, and/or
wherein the test interface includes a first output port configured to output at least one of the first input signal propagated in the first waveguide and the second input signal propagated in the first waveguide.

5. A test arrangement according to claim 1, wherein:
the second ports are arranged to receive a plurality of second input signals, wherein frequencies of the second input signals are different from the frequency of the first input signal;
the second waveguides are configured to propagate respective ones of the second input signals; and
the first ports are arranged to output respective ones of the second input signals.

6. A test arrangement according to claim 5, wherein the test interface is arranged to output said first test signals and said second test signals simultaneously, and/or
wherein the test interface includes a first output port configured to output at least one of the first input signal propagated in the first waveguide and the second input signal propagated in the first waveguide.

7. A test arrangement according to claim 4, wherein the apparatus includes an antenna arrangement arranged to produce an output based on the plurality of first test signals, the test arrangement comprising:
a detector configured to detect spatial variations in a radiation pattern of the antenna arrangement of the apparatus.

8. A test arrangement according to claim 7, comprising:
a second test interface having a third waveguide arranged to propagate the first input signal, a plurality of fourth waveguides coupled to the third waveguide and a second plurality of first ports corresponding to respective ones of the fourth waveguides, wherein:
the third waveguide is arranged to receive the first input signal from the first waveguide;
the third waveguide and the fourth waveguides are configured to propagate the first input signal; and
the second plurality of first ports are arranged to output the first input signal propagated in respective ones of the fourth waveguides as respective first test signals.

9. A test arrangement according to claim 7, comprising:
a second test interface configured to receive a plurality of further input signals from the apparatus, the second test interface including a third waveguide and a plurality of fourth waveguides coupled to the first waveguide and a further plurality of first ports corresponding to respective ones of the fourth waveguides; and the fourth waveguides being arranged to propagate respective ones of the plurality of signals, wherein:
the first waveguide is arranged to output a multiplexed signal including the plurality of further input signals; and/or
the further plurality of first ports is configured to output the further input signals propagated in respective ones of the fourth waveguides.

10. A test arrangement according to claim 1, wherein the apparatus includes an antenna arrangement arranged to produce an output based on the plurality of first test signals, the test arrangement comprising:
a detector configured to detect spatial variations in a radiation pattern of the antenna arrangement of the apparatus.

11. A test arrangement according to claim 1, wherein the first interface includes a first output port, arranged to output at least one of the first input signal propagated in the first waveguide and a multiplexed signal combining the second input signals propagated in the first waveguide; and/or
wherein the apparatus includes an antenna arrangement arranged to produce an output based on the plurality of second test signals, the test arrangement comprising:
a detector configured to detect spatial variations in a radiation pattern of the antenna arrangement of the apparatus.

12. A test arrangement according to claim 1, comprising:
a second test interface having a third waveguide arranged to propagate the first input signal, a plurality of fourth waveguides coupled to the third waveguide and a second plurality of first ports corresponding to respective ones of the fourth waveguides, wherein:
the third waveguide is arranged to receive the first input signal from the first waveguide;
the third waveguide and the fourth waveguides are configured to propagate the first input signal; and
the second plurality of first ports are arranged to output the first input signal propagated in respective ones of the fourth waveguides as respective first test signals.

13. A test arrangement according to claim 1, comprising:
a second test interface configured to receive a plurality of further input signals from the apparatus, the second test interface including a third waveguide and a plurality of fourth waveguides coupled to the first waveguide and a further plurality of first ports corresponding to respective ones of the fourth waveguides; and the fourth waveguides being arranged to propagate respective ones of the plurality of signals, wherein:
the first waveguide is arranged to output a multiplexed signal including the plurality of further input signals; and/or
the further plurality of first ports is configured to output the further input signals propagated in respective ones of the fourth waveguides.

14. A test arrangement comprising:
a test interface configured to receive a plurality of first input signals from an apparatus;
wherein:
the test interface includes a first waveguide, a plurality of second waveguides coupled to the first waveguide, a plurality of first ports corresponding to respective ones of the second waveguides, and a plurality of second ports corresponding to respective ones of the second waveguides;
the second ports are arranged to receive a plurality of second input signals for propagation in respective ones of the second waveguides and in the first waveguide; and
the first ports are arranged to output respective ones of the second input signals propagated in respective ones of the second waveguides;
the second waveguides are arranged to receive respective ones of the first input signals through respective ones of the first ports;
the second waveguides are configured to propagate the respective ones of the first input signals; and
the first waveguide includes a first port, configured to output a multiplexed signal including the plurality of first input signals.

15. A test arrangement according to claim 14, comprising:
wherein the second ports are arranged to output respective ones of the first input signals propagated in respective ones of the second waveguides.

16. A test arrangement according to claim 15, configured to test an apparatus including an antenna arrangement, wherein:
the test arrangement is configured to supply the signals output by the second ports to the antenna arrangement; and
the test arrangement includes a detector configured to detect spatial variations in a radiation pattern of the antenna arrangement.

17. A method comprising:
providing a test interface configured to provide a plurality of test signals to an apparatus, the test interface including a first waveguide, a plurality of second waveguides coupled to the first waveguide and pluralities of first and second ports corresponding to respective ones of the second waveguides, the second ports being arranged to receive a plurality of second input signals for propagation in respective ones of the second waveguides and in the first waveguide, and the first ports being arranged to output respective ones of the second input signals propagated in respective ones of the second waveguides;
providing a first input signal to the first waveguide to be propagated in the second waveguides; and
outputting from the first ports respective ones of the first input signals propagated in the second waveguides to provide the plurality of test signals.

18. A method comprising:
providing a test interface configured to receive a plurality of signals from an apparatus, the test interface including a first waveguide, a plurality of second waveguides coupled to the first waveguide and pluralities of first and second ports corresponding to respective ones of the second waveguides, the second ports being arranged to receive said plurality of signals for propagation in respective ones of the second waveguides and in the first waveguide, and the first ports being arranged to output respective ones of said plurality of signals propagated in respective ones of the second waveguides;
providing said plurality of signals from the apparatus to respective ones of the second waveguides for propagation in the respective ones of the second waveguides and in the first waveguide; and
outputting from a port of the first waveguide a multiplexed signal including the plurality of signals propagated in respective ones of the second waveguides.

* * * * *